US009592724B1

(12) United States Patent
Trujillo et al.

(10) Patent No.: US 9,592,724 B1
(45) Date of Patent: Mar. 14, 2017

(54) CHASSIS FOR A REMOTELY CONTROLLED VEHICLE

(71) Applicant: Horizon Hobby, LLC, Champaign, IL (US)

(72) Inventors: Richard Trujillo, Fontana, CA (US); Akira Kogawa, Orange, CA (US)

(73) Assignee: HORIZON HOBBY, LLC, Champaign, IL (US)

( * ) Notice: Subject to any disclaimer, the term of this patent is extended or adjusted under 35 U.S.C. 154(b) by 0 days.

(21) Appl. No.: 14/701,048

(22) Filed: Apr. 30, 2015

(51) Int. Cl.
   *B60T 7/16* (2006.01)
   *B60K 1/04* (2006.01)
   *B62D 21/00* (2006.01)
   *B62D 21/14* (2006.01)
   *G05D 1/00* (2006.01)

(52) U.S. Cl.
   CPC ............... *B60K 1/04* (2013.01); *B62D 21/00* (2013.01); *B62D 21/14* (2013.01); *G05D 1/0011* (2013.01); *B60K 2001/0411* (2013.01)

(58) Field of Classification Search
   CPC . B60K 11/10; B60K 5/01; B60K 1/04; B62D 21/00; B60T 7/16
   See application file for complete search history.

(56) References Cited

U.S. PATENT DOCUMENTS

| 4,090,577 | A | * | 5/1978 | Moore | B60K 6/28 105/50 |
| 4,365,681 | A | * | 12/1982 | Singh | B60K 1/04 105/51 |
| 4,696,508 | A | * | 9/1987 | Brautigam | H01M 2/1083 180/68.5 |
| 5,305,513 | A | * | 4/1994 | Lucid | B60K 1/04 104/34 |
| 5,934,694 | A | * | 8/1999 | Schugt | B60L 11/1816 180/167 |
| 6,702,058 | B2 | * | 3/2004 | Ishii | B62K 5/01 180/311 |
| 6,793,248 | B1 | * | 9/2004 | Sung | B62D 21/14 180/208 |
| 7,070,015 | B2 | * | 7/2006 | Mathews | B60K 1/04 180/274 |
| 7,255,191 | B2 | * | 8/2007 | Baldwin | B62K 11/10 180/220 |
| 7,389,844 | B2 | * | 6/2008 | Van Der Bijl | B62D 21/02 180/291 |
| 7,770,673 | B2 | * | 8/2010 | Allen | B60L 3/04 116/227 |

(Continued)

*Primary Examiner* — Hau Phan
(74) *Attorney, Agent, or Firm* — Barnes & Thornburg LLP

(57) ABSTRACT

An example vehicle includes a battery tray that is movably coupled to a front axle assembly of the vehicle. A back end of the tray is coupled to a first chassis member and a second chassis member of the vehicle via respective joints that allow rotational motion of the tray with respect to the first chassis member and the second chassis member. The vehicle's chassis includes a first rail comprising a first plurality of holes and a second rail comprising a second plurality of holes. The first rail slides within the second rail to provide an adjustable wheel-base length or width for various configurations of the vehicle. When the first plurality of holes and the second plurality of holes are aligned, one or more fasteners may be used to secure the first rail to the second rail to select a particular wheel-base length or width.

8 Claims, 7 Drawing Sheets

(56) References Cited

U.S. PATENT DOCUMENTS

| | | | | |
|---|---|---|---|---|
| 8,459,399 B2* | 6/2013 | Ohashi | ........................ | 180/312 |
| 8,807,597 B2* | 8/2014 | Akaki | .................... | B62D 21/02 |
| | | | | 180/232 |
| 8,973,254 B2* | 3/2015 | Droste | ................ | B60L 11/1877 |
| | | | | 29/730 |
| 2005/0039964 A1* | 2/2005 | Goyry | ..................... | B60K 1/04 |
| | | | | 180/243 |
| 2005/0083208 A1* | 4/2005 | Konno | ............... | G07C 9/00182 |
| | | | | 340/12.22 |
| 2006/0289224 A1* | 12/2006 | Ono | ........................ | B60K 1/04 |
| | | | | 180/311 |
| 2007/0034433 A1* | 2/2007 | Gabriele | ................ | A63H 30/04 |
| | | | | 180/167 |
| 2011/0106339 A1* | 5/2011 | Phillips | ................ | G05D 1/0033 |
| | | | | 701/2 |
| 2015/0112507 A1* | 4/2015 | Loewel | ................ | H04L 67/125 |
| | | | | 701/1 |

\* cited by examiner

CHASSIS FOR A REMOTELY CONTROLLED VEHICLE

FIELD

This disclosure generally relates to chassis or frames of remotely controlled (RC) vehicles.

BACKGROUND

Many RC vehicles are electrically powered by an on-board battery. Such vehicles often include a chassis having a battery tray that holds the battery near a rear axle of the vehicle. The chassis of such vehicles is also generally non-adjustable and sized for particular wheel-base widths and/or lengths.

SUMMARY

A chassis of an electric RC vehicle may include a tray that is configured to hold a battery. The position of the tray within the chassis can affect performance of the vehicle because the battery will generally make up a significant portion of the mass of the vehicle. The tray may be configured to hold the battery near (e.g., above) a front axle of the vehicle, instead of near a back axle of the vehicle as is currently known. Holding the battery near the front axle of the vehicle may be beneficial in several ways. For example, a front-mounted battery may improve handling of the vehicle and/or make the car more stable during operation. In the case of a front-wheel drive or all-wheel drive vehicle, a front-mounted battery may also improve fraction provided by the front wheels of the vehicle.

A front-mounted battery may have aesthetic benefits as well. For example, a front-mounted battery may make it easier to hide the battery under an aesthetic "shell," thus causing the vehicle to have an appearance more closely resembling a full-size vehicle that the RC vehicle was designed to emulate.

The chassis of the vehicle may also be adjustable to beneficially accommodate multiple wheel-base lengths (or widths). In one example, the adjustable chassis may be configured for a first wheel-base length that is suitable for high-speed operation of the vehicle on a smooth driving surface. In another example, the adjustable chassis may be configured for a second wheel-base length that is suitable to maintain traction on a rough or unpaved driving surface. A narrow wheel-base length may be advantageous for driving the vehicle within tight confines, whereas a wider wheel-base length may accommodate additional wheels (e.g., for a six-wheel "rock crawler"). Examples disclosed herein provide these and other capabilities.

In a first example, a vehicle includes a first chassis member, a second chassis member, a front axle assembly, and a tray configured to hold a battery. The tray is located between the first chassis member and the second chassis member. A front end of the tray is movably coupled to the front axle assembly. A back end of the tray is coupled to the first chassis member and the second chassis member via respective joints configured to allow rotational motion of the tray with respect to the first chassis member and the second chassis member.

In a second example, a vehicle includes a first rail comprising a first plurality of holes and a second rail comprising a second plurality of holes. The first rail is configured to slide within the second rail to adjust a combined length of the first and second rails to within a given range of lengths. When a first hole of the first plurality of holes and a second hole of the second plurality of holes are aligned, the first and second holes are configured to receive a fastener that secures the first rail to the second rail so that the combined length of the first and second rails has a particular length within the given range of lengths.

In a third example, a remotely-controlled vehicle system includes a vehicle comprising a receiver. The vehicle is configured to move in response to (or at least based on) the receiver receiving a signal from a controller. The vehicle further includes a first chassis member, a second chassis member, a front axle assembly, and a tray configured to hold a battery. The tray is located between the first chassis member and the second chassis member. A front end of the tray is movably coupled to the front axle assembly and a back end of the tray is coupled to the first chassis member and the second chassis member via respective joints configured to allow rotational motion of the tray with respect to the first chassis member and the second chassis member.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, can be arranged, substituted, combined, separated, and designed in a wide variety of different configurations, all of which are explicitly contemplated herein.

Figure 1:
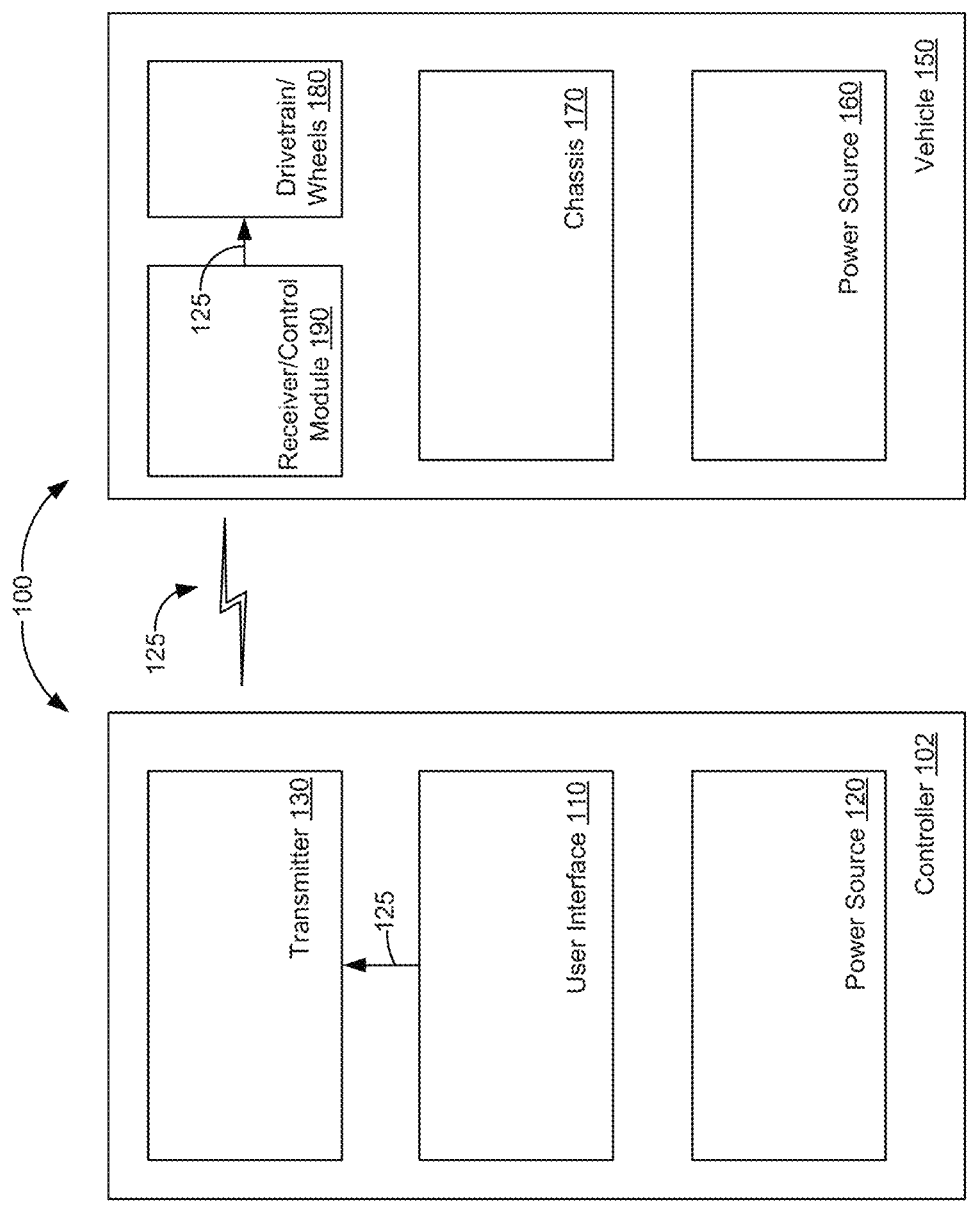
FIG. 1 is a simplified block diagram of an example RC vehicle system.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein FIG. 1 is a simplified block diagram of an example RC vehicle system 100. The RC vehicle system 100 includes a controller 102 and a vehicle 150. The controller 102 includes a user interface 110, a power source 120, and a transmitter 130. The vehicle 150 includes a power source 160, a chassis 170, drivetrain/wheels 180, and a receiver/control module 190.

The user interface 110 may be configured to receive user input(s) that represents commands for the vehicle 150. Such commands may include commands for the vehicle 150 to accelerate, decelerate, or brake, for example. The commands may also include commands to engage various gears of the drivetrain 180 (e.g., shift), move forward, or move backwards. The user interface 110 may include one or more of a steering wheel, a joystick, a button, a lever, a keyboard, or a touchscreen configured to generate control signals 125 representing such commands. The user interface 110 provides the control signals 125 to the transmitter 130 for wireless transmission to the vehicle 150.

The power source 120 may be a removable or non-removable battery configured to provide power to the user interface 110 and/or the transmitter 130.

The transmitter 130 is configured to receive the control signals 125 and transmit the control signals 125 to the receiver/control module 190. The transmitter 130 may include an antenna, for example. The transmitter 130 transmits the control signals 125 using one or more carrier waves having a specific frequency or range of frequencies that the receiver/control module 190 is configured to receive. In operation, the transmitter 130 transmits the control signals 125 to the receiver/control module 190 over a range of at least several tens or hundreds of meters, but other examples are possible.

The power source 160 may be a removable or non-removable battery configured to provide power to the receiver/control module 190 and/or the drivetrain/wheels 180.

The chassis 170 provides structural support for the drivetrain/wheels 180, the receiver/control module 190, and/or any other portion of the vehicle 150. In some examples, the chassis 170 includes one or more chassis members that are adjustable so as to provide an adjustable wheel-base length and/or width for various configurations of the vehicle 150. The chassis 170 may also include a tray configured to secure the power source 160 above or otherwise near a front axle assembly of the drivetrain 180. The chassis 170 may be constructed from materials such as aluminum, carbon fiber, injection molded plastic, or other suitable materials.

The drivetrain/wheels 180 includes one or more wheels configured to contact a driving surface and propel the vehicle 150 to move relative to the driving surface. The power source 160 is configured to provide power to the wheels via the drivetrain 180. The drivetrain 180 typically includes a motor, gears, axles, and/or differentials configured to convert electrical energy stored by the power source 160 into mechanical motion of the wheels 180. The drivetrain 180 may also include one or more steering mechanisms configured to turn one or more of the wheels 180 for directional control of the vehicle 150. The drivetrain/wheels 180 may directly or indirectly receive control signals 125 from the receiver/control module 190 thereby causing the drivetrain/wheels 180 to move the vehicle 150 as indicated by the control signals 125. For example, the receiver/control module 190 may include motor control circuitry that controls a speed or direction of rotation of a motor according to the control signals 125.

The receiver/control module 190 may also include an antenna configured to receive control signals 125 transmitted by the transmitter 130. The receiver/control module 190 may also include a processor, microcontroller, storage memory, or any combination of hardware, software, and/or firmware configured to provide control signals 125 to the drivetrain 180 so that the vehicle 150 moves based on the control signals 125.

Figure 2:
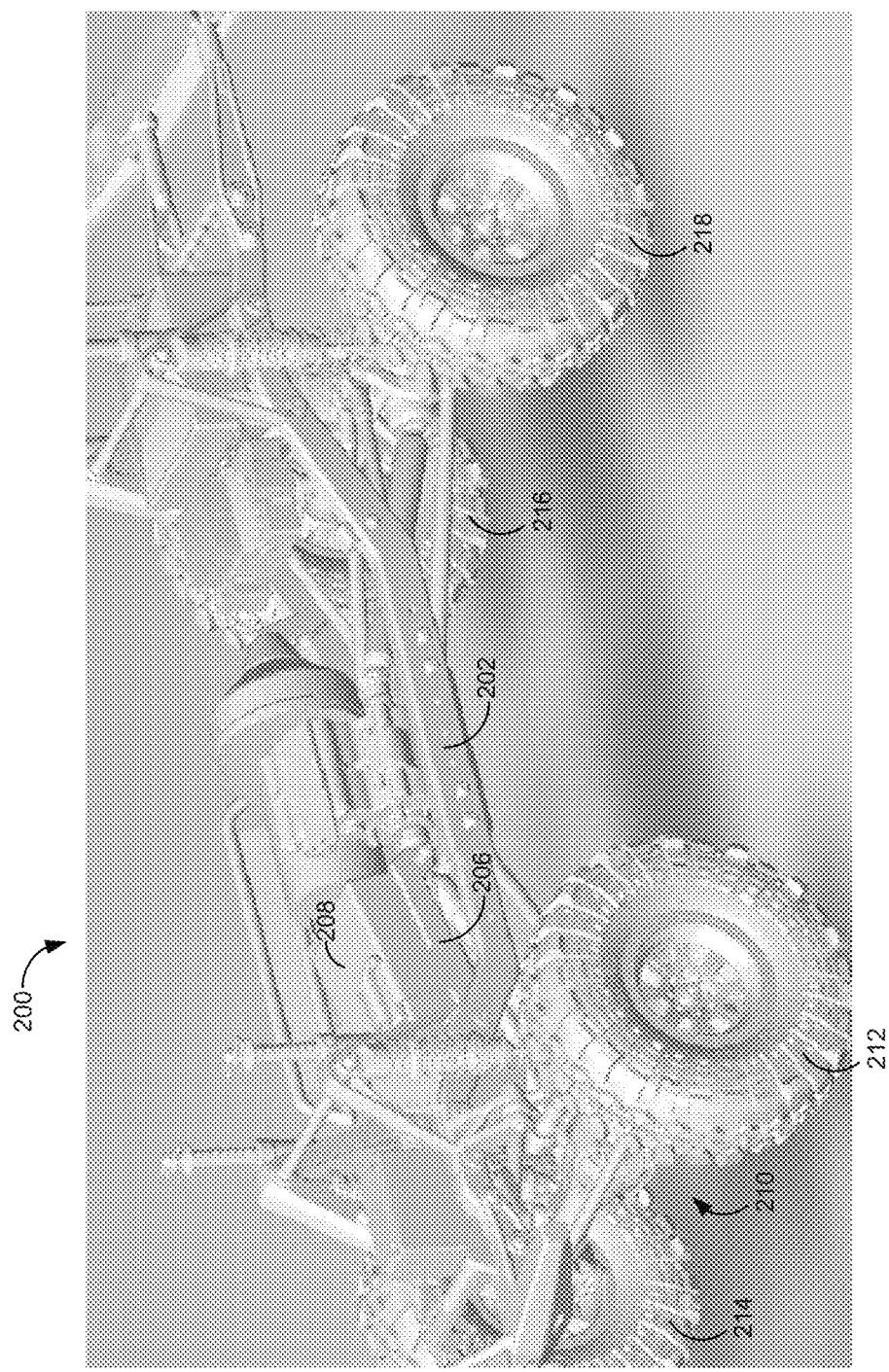
FIG. 2 is a left-side view of an example RC vehicle.

FIG. 2 is a left-side view of an RC vehicle 200. The RC vehicle 200 includes a first chassis member 202, a second chassis member (not shown in FIG. 2), a battery tray 206, a battery 208, a front axle assembly 210, and wheels 212, 214, 216, and 218.

The first chassis member 202 is configured to provide structural support along the left side of the vehicle 200. The second chassis member that is similar to the first chassis member 202 is located on the right side of the vehicle 200 and is similarly configured to provide structural support along the right side of the vehicle 200. In some embodiments, the first chassis member 202 and the second chassis member are each formed with two sliding rails that are adjustable to increase or decrease a wheel-base length of the vehicle 200. (See FIG. 4 and accompanying description below for more details.) Within this disclosure, the term "wheel-base length" may generally refer to a distance separating a front wheel of the vehicle from a rear wheel of the vehicle and the term "wheel-base width" may generally refer to a distance separating a left wheel of the vehicle from a right wheel of the vehicle. However, these terms represent an arbitrary convention and are not meant to be limiting.

For example, in some embodiments, the first chassis member 202 and the second chassis member are adjustable in length so as to vary (i) the distance separating the wheel 212 and the wheel 218 and (ii) the distance separating the wheel 214 and the wheel 216. In other embodiments, chassis members of the vehicle are additionally or alternatively adjustable to vary (i) the distance separating the wheel 212 from the wheel 214 and (ii) the distance separating the wheel 216 from the wheel 218.

The battery tray 206 is configured to hold the battery 208 (or perhaps multiple batteries) that provides power to the vehicle 200. As shown in FIG. 2, the battery tray 206 is located near the front end of the vehicle 200 instead of being near the center of the vehicle 200 or near the rear end of the vehicle 200 as is typical for most radio controlled vehicles. In some embodiments, the battery tray 206 is coupled to the front axle assembly 210 via a linkage mechanism (not shown in FIG. 2).

The front axle assembly 210 includes an axle configured to transfer mechanical power from a drivetrain of the vehicle 200 to the wheels 212 and 214. In other examples, the wheels 212 and 214 might only be used for steering the vehicle 200, and the front axle assembly 210 may allow for free rotational motion and steering motion of the wheels 212 and 214, but might not provide drive power to the wheels 212 and 214.

Figure 3A:
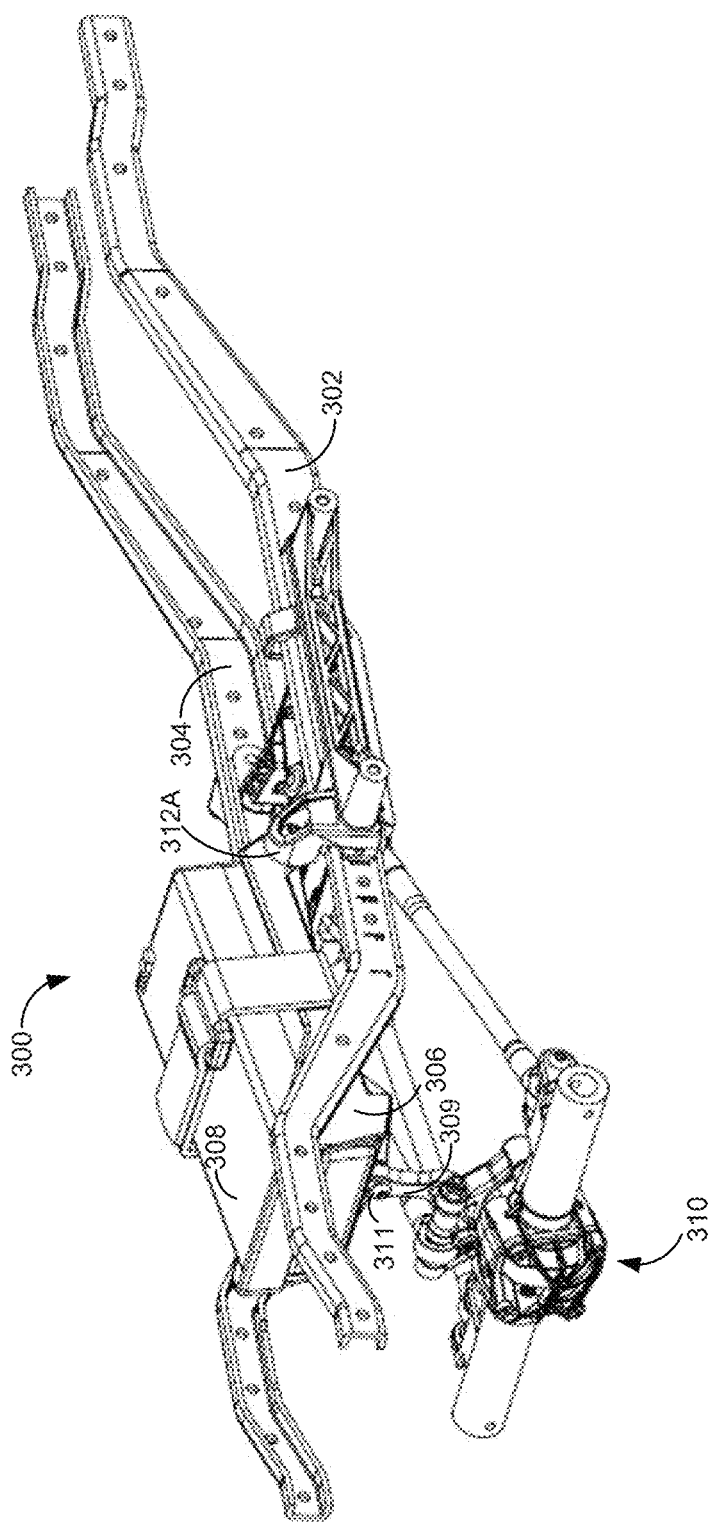
FIG. 3A is a left-side view of a chassis and a battery tray of an example RC vehicle.

FIG. 3A is a left-side view of a chassis and a battery tray of an example RC vehicle according to some embodiments. More specifically, FIG. 3A illustrates a chassis 300, a first chassis member 302, a second chassis member 304, a battery tray 306, a battery 308, a linkage mechanism 309, a front axle assembly 310, a fastener 311, and a joint 312A. Some embodiments may include a battery tray 306 configured to hold multiple batteries in various configurations.

The battery tray 306 is configured to hold the battery 308 between the first chassis member 302 and the second chassis member 304. The battery tray 306 is coupled to the first chassis member 302 via a first joint 312A and coupled to the second chassis member 304 via a second joint (not shown in FIG. 3A). The first joint 312A and the second joint are each respectively configured to couple the back end of the battery tray 306 to the first chassis member 302 and the second chassis member 304. In some embodiments, the first joint 312A and the second joint are configured to allow the battery tray 306 to rotate with respect to the first chassis member 302 and the second chassis member 304.

As shown in FIG. 3A, the first joint 312A may be configured to receive a fastener-like extension of the battery tray 306. The extension of the battery tray 306 may be "snapped" into the first joint 312A to secure the battery tray 306 to the first chassis member 302. In operation, the joint 312A allows the battery tray 306 to rotate with respect to the joint 312A and the first chassis member 302, perhaps in response to movement of the vehicle. Alternatively, the joint 312A may be configured to receive a separate fastener to secure the battery tray 306 to the first chassis member 302.

The front end of the battery tray 306 is movably coupled to the front axle assembly 310 via the linkage mechanism 309. In some embodiments, the linkage mechanism 309 may include an opening for receiving the fastener 311, which secures the linkage mechanism 309 to the battery tray 306. The fastener 311 may be an extension of the battery tray 306 or a separate fastener. In operation, the linkage mechanism 309 receives the fastener 311 in a manner that allows the battery tray 306 to rotate with respect to the front axle assembly 310 and the linkage mechanism 309. The linkage mechanism 309 may also be secured to the front axle assembly 310 via another fastener (shown in FIG. 3B).

Figure 3B:
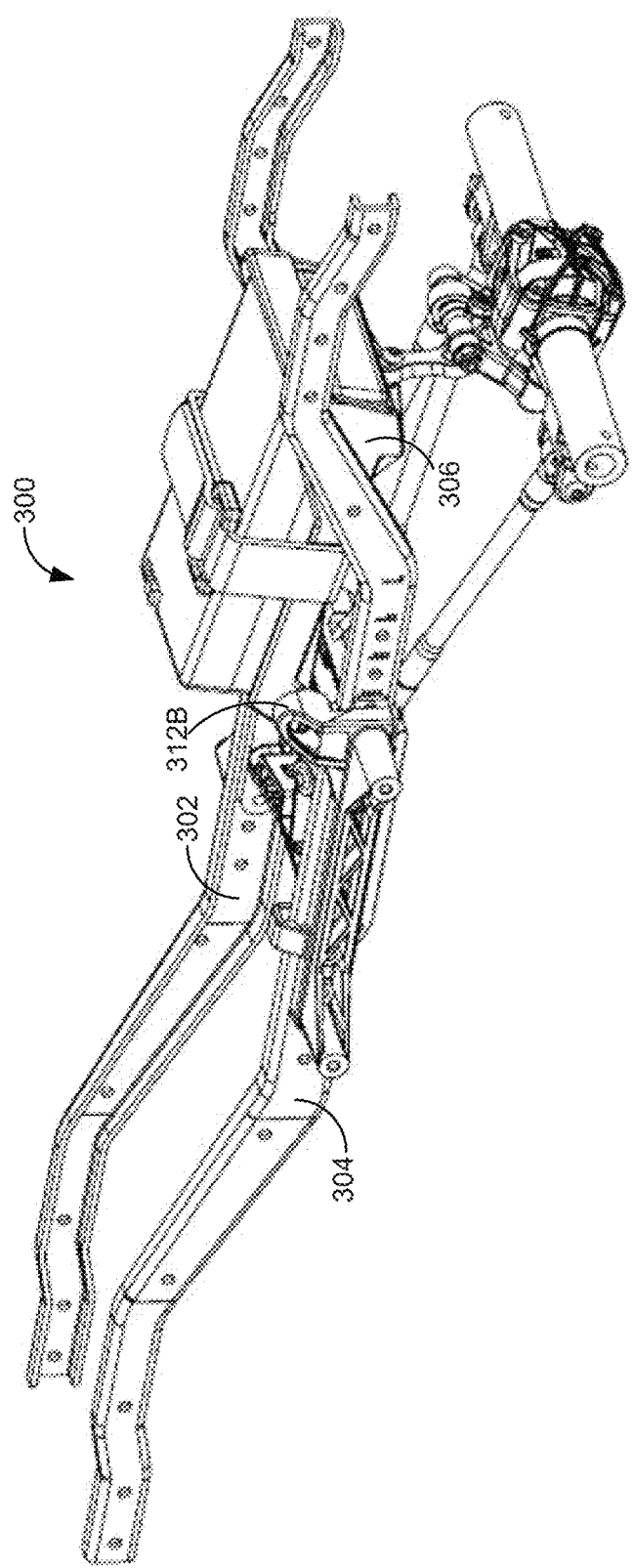
FIG. 3B is a right-side view of a chassis and a battery tray of an example RC vehicle.

FIG. 3B is a right-side view of a chassis and a battery tray of an RC vehicle. More specifically, FIG. 3B illustrates the chassis 300, the first chassis member 302, the second chassis member 304, the battery tray 306, and the second joint 312B.

The second joint 312B is configured to couple the back end of the battery tray 306 to the second chassis member 304. The second joint 312B may be configured to allow the battery tray 306 to rotate with respect to the second chassis member 304. As shown in FIG. 3B, the second joint 312B is configured to receive a fastener-like extension of the battery tray 306. This extension of the battery tray 306 may be "snapped" into the second joint 312B to secure the battery tray 306 to the second chassis member 304. In operation, the joint 312B allows the battery tray 306 to rotate with respect to the joint 312B and the second chassis member 304, perhaps in response to movement of the vehicle. Alternatively, the joint 312B may be configured to receive a separate fastener to secure the battery tray 306 to the second chassis member 304.

Figure 3C:
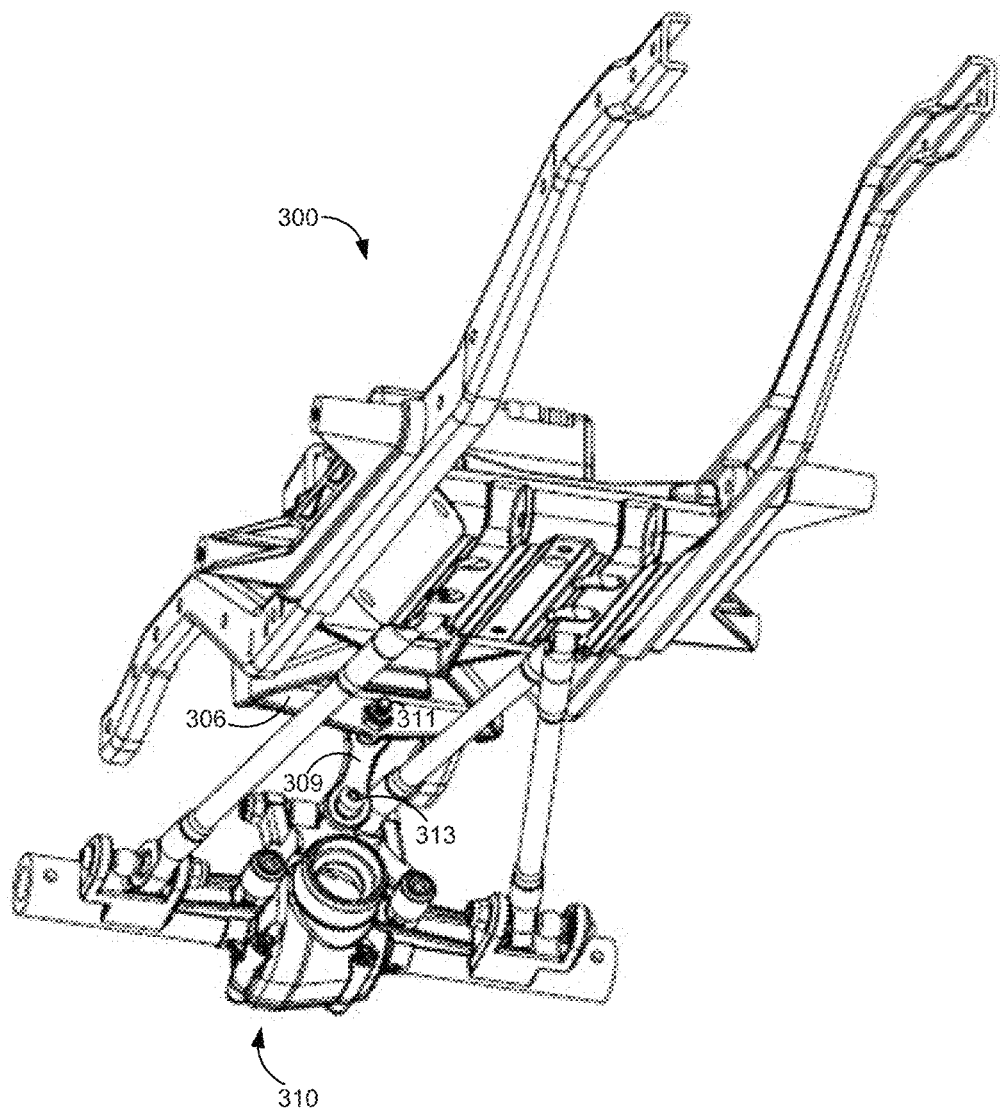
FIG. 3C is back-side view of a chassis and a battery tray of an example RC vehicle.

FIG. 3C is back-side view of a chassis and a battery tray of an RC vehicle. More specifically, FIG. 3C illustrates the chassis 300, the linkage mechanism 309, the front axle assembly 310, the fastener 311, and a fastener 313. As shown, the front axle assembly 310 may be coupled to the linkage mechanism 309 via the fastener 313. In some embodiments, the fastener 313 and linkage mechanism 309 is configured to enable the battery tray 306 to rotate with respect to the front axle assembly 310.

Figure 4:
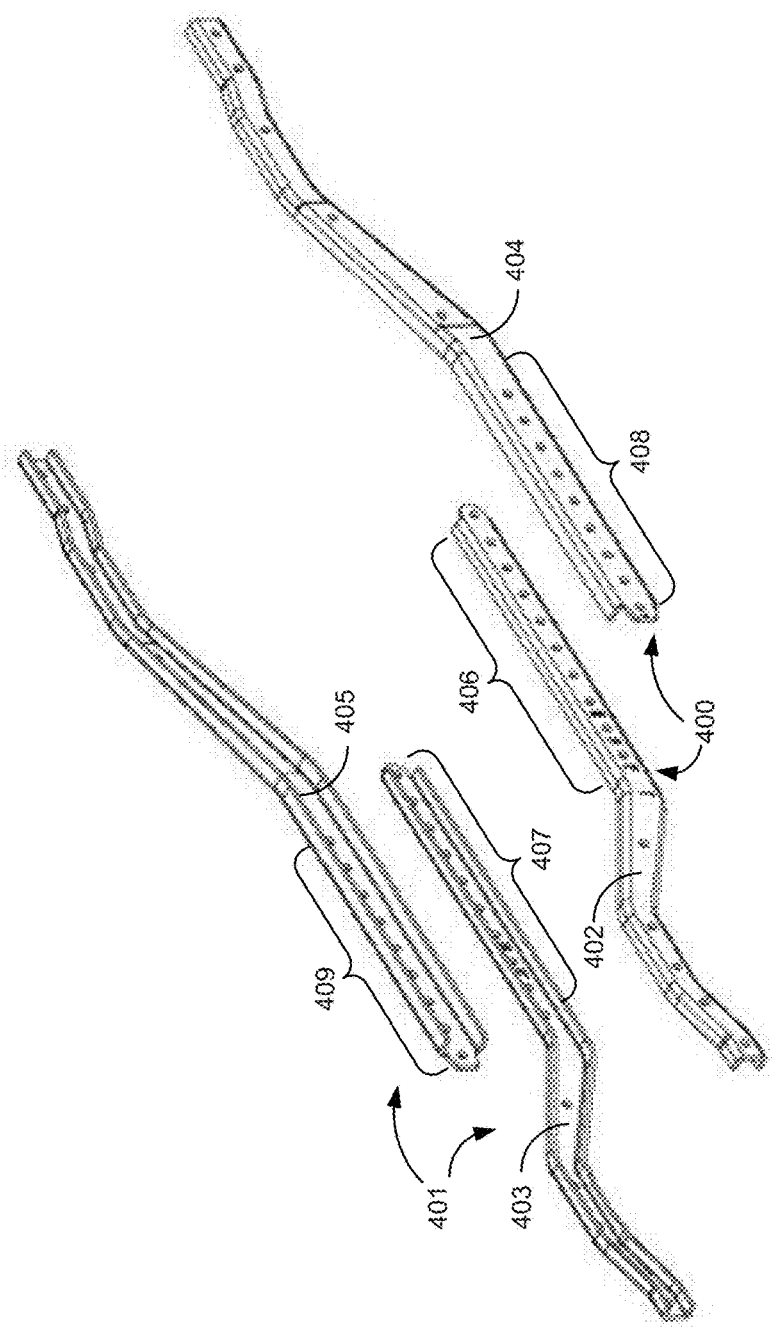
FIG. 4 is an exploded view of a chassis of an example RC vehicle.

FIG. 4 is an exploded view of a chassis of an example RC vehicle. More specifically, FIG. 4 illustrates a chassis member 400 comprising a rail 402 and a rail 404, and a chassis member 401 comprising a rail 403 and a rail 405. The rail 402 comprises a plurality of holes 406 and the rail 404 comprises a plurality of holes 408. The rail 403 comprises a plurality of holes 407 and the rail 405 comprises a plurality of holes 409.

The chassis members 400 and 401 may be used to adjust a wheel-base length and/or width of the vehicle, as described above with regard to FIG. 2. That is, the chassis members 400 and 401 may be similar to any of chassis member 202 of FIG. 2 and chassis members 302 and 304 of FIGS. 3A-B.

For example, the rail 402 may be configured to slide within the rail 404 so that a combined length of the chassis member 400 may be adjusted within a given range of lengths. At various sliding positions, one or more holes of the plurality of holes 406 will respectively align with one or more holes of the plurality of holes 408. At any of these sliding positions, one or more fasteners may be inserted through overlapping holes of the plurality 406 and the plurality 408 so that the rails 402 and 404 are secured to have a particular combined length. The rails 403 and 405 and their respective pluralities of holes 407 and 409 function in a similar manner.

Figure 5:
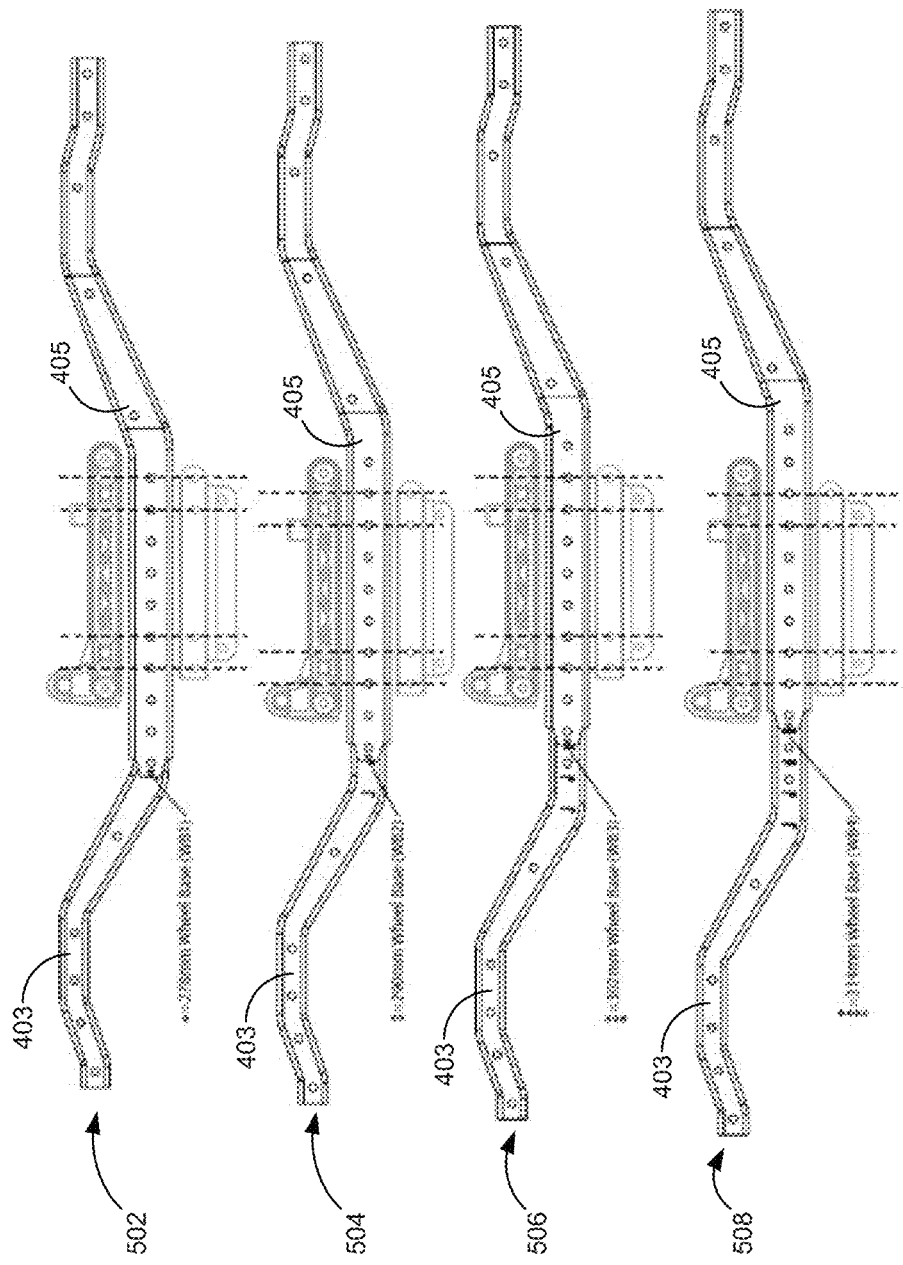
FIG. 5 illustrates a chassis in various configurations that correspond respectively to different wheel-base lengths of an example vehicle.

FIG. 5 illustrates example chassis rails in various configurations that correspond respectively to differing wheel-base lengths. More specifically, FIG. 5 illustrates the rail 403 and the rail 405 in a first configuration 502, a second configuration 504, a third configuration 506, and a fourth configuration 508.

The rails 403 and 405 may be used to adjust a wheel-base length and/or width of the vehicle, as described above with regard to FIG. 2. That is, the rails 403 and 405 may be included as part of any of chassis member 202 of FIG. 2 and chassis members 302 and 304 of FIGS. 3A-B.

As shown in FIG. 5, the first configuration 502 may be defined by a wheel-base length of 278 mm. In this example, the first configuration 502 corresponds to the smallest possible combined length of the rails 403 and 405 that allows for the holes of the rail 403 to be aligned with the holes of the rail 405.

The second configuration 504 may be defined by a wheel-base length of 290 mm. In this example, the second configuration 504 corresponds to the second-smallest possible combined length of the rails 403 and 405 that allows for the holes of the rail 403 to be aligned with the holes of the rail 405.

The third configuration 506 may be defined by a wheel-base length of 302 mm. In this example, the third configuration 506 corresponds to the third-smallest possible combined length of the rails 403 and 405 that allows for the holes of the rail 403 to be aligned with the holes of the rail 405.

The fourth configuration 508 may be defined by a wheel-base length of 314 mm. In this example, the fourth configuration 508 corresponds to the fourth-smallest possible combined length of the rails 403 and 405 that allows for the holes of the rail 403 to be aligned with the holes of the rail 405. Generally, the rails 403 and 405 may be adjustable to any number of combined lengths.

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

What is claimed is:

1. A remotely-controlled vehicle system comprising:
a vehicle comprising a receiver, wherein the vehicle is configured to move based on the receiver receiving a signal from a controller, the vehicle further comprising:
a first chassis member;
a second chassis member;
a front axle assembly; and
a tray configured to hold a battery, wherein:
the tray is located between the first chassis member and the second chassis member,
a front end of the tray is movably coupled to the front axle assembly; and
a back end of the tray is coupled to the first chassis member and the second chassis member via respective joints configured to allow rotational motion of the tray with respect to the first chassis member and the second chassis member.

2. The remotely-controlled vehicle system of claim 1, wherein the front end of the tray is movably coupled to the front axle assembly via a linkage mechanism.

3. The remotely-controlled vehicle system of claim 2, wherein an end of the linkage mechanism is coupled to the front axle assembly via a fastener.

4. The remotely-controlled vehicle system of claim 2, wherein an end of the linkage mechanism is coupled to the front end of the tray via a fastener.

5. The remotely-controlled vehicle system of claim 2, wherein the linkage mechanism comprises:
a first end coupled to the front axle assembly via a first fastener; and
a second end coupled to the front end of the tray via a second fastener.

6. The remotely-controlled vehicle system of claim 2, wherein the linkage mechanism is configured to rotate about the first fastener, thereby enabling motion of the tray with respect to the front axle assembly.

7. The remotely-controlled vehicle system of claim 2, wherein the linkage mechanism is configured to rotate about the second fastener, thereby enabling motion of the tray with respect to the linkage mechanism.

8. The remotely-controlled vehicle system of claim 1, wherein the front axle assembly comprises an axle coupled to one or more steerable wheels of the vehicle.

* * * * *